US012763704B2

(12) United States Patent
Aust et al.

(10) Patent No.: US 12,763,704 B2
(45) Date of Patent: Oct. 13, 2026

(54) MAGNETIC LEVITATION SYSTEM, PROCESSING SYSTEM, AND METHOD OF TRANSPORTING A CARRIER

(71) Applicant: Applied Materials, Inc., Santa Clara, CA (US)

(72) Inventors: Henning Aust, Mühltal (DE); Clemens Pihan, Darmstadt (DE); Timo Adler, Gernsheim (DE); Martin Aenis, Darmstadt (DE)

(73) Assignee: Applied Materials, Inc., Santa Clara, CA (US)

( * ) Notice: Subject to any disclaimer, the term of this patent is extended or adjusted under 35 U.S.C. 154(b) by 797 days.

(21) Appl. No.: 17/770,237

(22) PCT Filed: Nov. 27, 2019

(86) PCT No.: PCT/EP2019/082765
§ 371 (c)(1),
(2) Date: Apr. 19, 2022

(87) PCT Pub. No.: WO2021/104622
PCT Pub. Date: Jun. 3, 2021

(65) Prior Publication Data

US 2022/0393618 A1 Dec. 8, 2022

(51) Int. Cl.
*H02N 15/00* (2006.01)
*B65G 49/06* (2006.01)
(Continued)

(52) U.S. Cl.
CPC ........... *H02N 15/00* (2013.01); *B65G 49/061* (2013.01); *B65G 54/02* (2013.01); *H02K 41/02* (2013.01); *B65G 2201/022* (2013.01)

(58) Field of Classification Search
CPC ...... H02N 15/00; B65G 54/02; B65G 49/061; B65G 2201/022; H02K 41/02; H01L 21/67712; H01L 21/67709; H01L 21/6734
(Continued)

(56) References Cited

U.S. PATENT DOCUMENTS 4,805,761 A 2/1989 Totsch
5,377,596 A * 1/1995 Ono .................. H01L 21/67709 104/284

(Continued)

FOREIGN PATENT DOCUMENTS

CN 109643680 A 4/2019
CN 109790618 A * 5/2019 ............. C23C 14/50

(Continued)

OTHER PUBLICATIONS

International Search Report and Written Opinion, PCT/EP2019/082765, Jun. 24, 2020.

(Continued)

*Primary Examiner* — S. Joseph Morano
*Assistant Examiner* — James William Jones
(74) *Attorney, Agent, or Firm* — Patterson + Sheridan, LLP

(57) ABSTRACT

A magnetic levitation system (100) for transporting a carrier (10) in a transport direction (T) is described. The magnetic levitation system includes at least one magnetic bearing (120) having a first actuator (121) with a U-shaped electromagnet for contactlessly holding the carrier (10) in a carrier transportation space (15), and a drive unit (130) having a second actuator (131) for moving the carrier (10) in the transport direction. The second actuator (131) or a projection of the second actuator along the transport direction (T) is partially surrounded by the U-shaped electromagnet.

20 Claims, 3 Drawing Sheets

(51) Int. Cl.
*B65G 54/02* (2006.01)
*H02K 41/02* (2006.01)

(58) Field of Classification Search
USPC .......................................................... 104/281
See application file for complete search history.

(56) References Cited

U.S. PATENT DOCUMENTS

| | | | | |
|---|---|---|---|---|
| 2015/0122180 | A1 | 5/2015 | Chang et al. | |
| 2015/0188399 | A1* | 7/2015 | Fukasawa ............ | H02K 41/031 310/12.11 |
| 2018/0214915 | A1* | 8/2018 | Butterbaugh ........... | B08B 3/024 |

FOREIGN PATENT DOCUMENTS

| | | | | | |
|---|---|---|---|---|---|
| DE | 102014003882 | A1 | | 9/2015 | |
| EP | 0648698 | A1 | | 4/1995 | |
| JP | S6036222 | A | | 2/1985 | |
| JP | 2016103633 | A | | 6/2016 | |
| KR | 100675559 | B1 | * | 2/2007 | |
| KR | 20080046761 | A | | 5/2008 | |
| KR | 20120059933 | A | | 6/2012 | |
| KR | 20130128117 | A | | 11/2013 | |
| KR | 20150078173 | | | 7/2015 | |
| WO | WO-2018145751 | A1 | * | 8/2018 | ............. C23C 14/02 |
| WO | WO-2018153480 | A1 | * | 8/2018 | ........... C23C 14/042 |
| WO | WO-2018153481 | A1 | * | 8/2018 | ........... C23C 14/042 |
| WO | WO-2018197010 | A1 | * | 11/2018 | ........... C23C 14/042 |
| WO | WO-2018210408 | A1 | * | 11/2018 | ............. C23C 14/50 |
| WO | 2018/224150 | A1 | | 12/2018 | |
| WO | 2019015783 | A1 | | 1/2019 | |
| WO | 2019037872 | A1 | | 2/2019 | |

OTHER PUBLICATIONS

Chinese Office Action dated May 27, 2024 for Application No. 201980101758.5.

Korean Office Action dated Jul. 1, 2024 for Application No. 10-2008-0046761.

* cited by examiner

MAGNETIC LEVITATION SYSTEM, PROCESSING SYSTEM, AND METHOD OF TRANSPORTING A CARRIER

TECHNICAL FIELD

Embodiments of the present disclosure relate to apparatuses and methods for transportation of carriers, particularly carriers used during processing of large area substrates. More specifically, embodiments of the present disclosure relate to apparatuses and methods for contactless transportation of carriers employable in processing systems for vertical substrate processing, e.g. material deposition on large area substrates for display production. In particular, embodiments of the present disclosure relate to magnetic levitation systems and methods for carrier transportation in vacuum processing systems.

BACKGROUND

Techniques for layer deposition on a substrate include, for example, sputter deposition, physical vapor deposition (PVD), chemical vapor deposition (CVD) and thermal evaporation. Coated substrates may be used in several applications and in several technical fields. For instance, coated substrates may be used in the field of display devices. Display devices can be used in the manufacture of television screens, computer monitors, mobile phones, other hand-held devices, and the like for displaying information. Typically, displays are produced by coating a substrate with a stack of layers of different materials.

In order to deposit a layer stack, an in-line arrangement of processing modules can be used. An in-line processing system includes a plurality of subsequent processing modules, such as deposition modules and optionally further processing modules, e.g., cleaning modules and/or etching modules, wherein processing aspects are subsequently conducted in the processing modules such that a plurality of substrates can continuously or quasi-continuously be processed in the in-line processing system.

The substrate may be carried by a carrier, i.e. a carrying device for carrying the substrate. The carrier is typically transported through a vacuum system using a transport system. The transport system may be configured for conveying the carrier having the substrate positioned thereon along one or more transport paths. At least two transport paths can be provided next to each other in the vacuum system, e.g. a first transport path for transporting the carrier in a forward direction and a second transport path for transporting the carrier in a return direction opposite to the forward direction.

The functionality of a display device typically depends on the coating thickness of the material, which has to be within a predetermined range. For obtaining high resolution display devices, technical challenges with respect to the deposition of materials need to be mastered. In particular, an accurate and smooth transportation of the substrate carriers and/or mask carriers through a vacuum system is challenging. For instance, particle generation due to wear of moving parts can deteriorate the manufacturing process. Accordingly, there is a demand for transportation of carriers in processing systems with reduced or minimized particle generation. Further, challenges are, for example, to provide robust carrier transport systems for high temperature vacuum environments at low costs.

Accordingly, there is a continuing demand for improved apparatuses and methods for transportation of carriers as well as for providing improved vacuum processing systems that overcome at least some problems of the state of the art.

SUMMARY

In light of the above, a magnetic levitation system for transporting a carrier, a processing system for vertically processing a substrate, and a method of transporting a carrier according to the independent claims are provided. Further aspects, advantages, and features are apparent from the dependent claims, the description, and the accompanying drawings.

According to an aspect of the present disclosure, a magnetic levitation system for transporting a carrier in a transport direction is provided. The magnetic levitation system includes at least one magnetic bearing having a first actuator with a U-shaped electromagnet for contactlessly holding the carrier in a carrier transportation space, the first actuator arranged above or below the carrier transportation space; and a drive unit having a second actuator for moving the carrier in the transport direction. The second actuator or a projection of the second actuator along the transport direction is partially surrounded by the U-shaped electromagnet.

According to another aspect of the present disclosure, a magnetic levitation system for transporting a carrier in a transport direction is provided. The magnetic levitation system includes at least one magnetic bearing having a first actuator for contactlessly holding the carrier in a carrier transportation space; and a drive unit having a second actuator for moving the carrier in the transport direction. Both the first actuator and the second actuator are centered above the carrier transportation space. Alternatively, both the first actuator and the second actuator are centered below the carrier transportation space. In particular, a central plane of the carrier transportation space may (centrally) intersect both the first actuator and second actuator.

"Centered above the carrier transportation space" as used herein may be understood to mean that the center of gravity G of the carrier is arranged both below the first actuator and the second actuator during the carrier transport, i.e. when the carrier is moved below the first actuator and below the second actuator.

According to a further aspect of the present disclosure, a processing system for vertically processing a substrate is provided. The processing system includes at least one vacuum processing chamber including a processing device. Additionally, the processing system includes one or more magnetic levitation systems for transporting one or more carriers in a transport direction. The one or more magnetic levitation systems are configured in accordance with any of the magnetic levitation systems described herein. In particular, the magnetic levitation systems include at least one magnetic bearing having a first actuator with a U-shaped electromagnet for contactlessly holding the carrier in a carrier transportation space, and a drive unit having a second actuator for moving the carrier in the transport direction. The second actuator or a projection of the second actuator along the transport direction is partially surrounded by the U-shaped electromagnet.

According to another aspect described herein, a magnetic levitation system for transporting a carrier in a transport direction is provided. The magnetic levitation system includes at least one magnetic bearing having a first actuator for contactlessly holding the carrier in a carrier transportation space; and a drive unit having a second actuator for moving the carrier in the transport direction. The first actuator and the second actuator are arranged above the carrier transportation space, or alternatively below the carrier transportation space.

According to another aspect of the present disclosure, a method of transporting a carrier is provided. The method includes contactlessly holding the carrier in a carrier transportation space using at least one magnetic bearing having a first actuator with a U-shaped electromagnet. The method further includes transporting the carrier in the transport direction using a drive unit having a second actuator, wherein the second actuator or a projection of the second actuator along the transport direction is partially surrounded by the U-shaped electromagnet.

According to another aspect of the present disclosure, a method of transporting a carrier is provided. The method includes contactlessly holding the carrier in a carrier transportation space using at least one magnetic bearing having a first actuator. The method further includes transporting the carrier in the transport direction using a drive unit having a second actuator, wherein both the first actuator and the second actuator are arranged above a center of gravity of the carrier, when the carrier moves below the first actuator and the second actuator.

When the first actuator and the second actuator are centered above the center of gravity of the carrier, both the holding force exerted by the first actuator and the drive force exerted by the second actuator may act symmetrically on the carrier with respect to a vertical plane extending through the center of gravity of the carrier, allowing a smooth and stable carrier transport and reducing carrier vibrations.

Embodiments are also directed at apparatuses for carrying out the disclosed methods and include apparatus parts for performing each described method aspect. These method aspects may be performed by way of hardware components, a computer programmed by appropriate software, by any combination of the two or in any other manner. Furthermore, embodiments according to the disclosure are also directed at methods for operating the described apparatus and methods of manufacturing the described apparatus. The methods for operating the described apparatus include method aspects for carrying out every function of the apparatus.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF EMBODIMENTS

Reference will now be made in detail to the various embodiments of the disclosure, one or more examples of which are illustrated in the figures. Within the following description of the drawings, the same reference numbers refer to same components. Only the differences with respect to individual embodiments are described. Each example is provided by way of explanation of the disclosure and is not meant as a limitation of the disclosure. Further, features illustrated or described as part of one embodiment can be used on or in conjunction with other embodiments to yield yet a further embodiment. It is intended that the description includes such modifications and variations.

Figure 1:
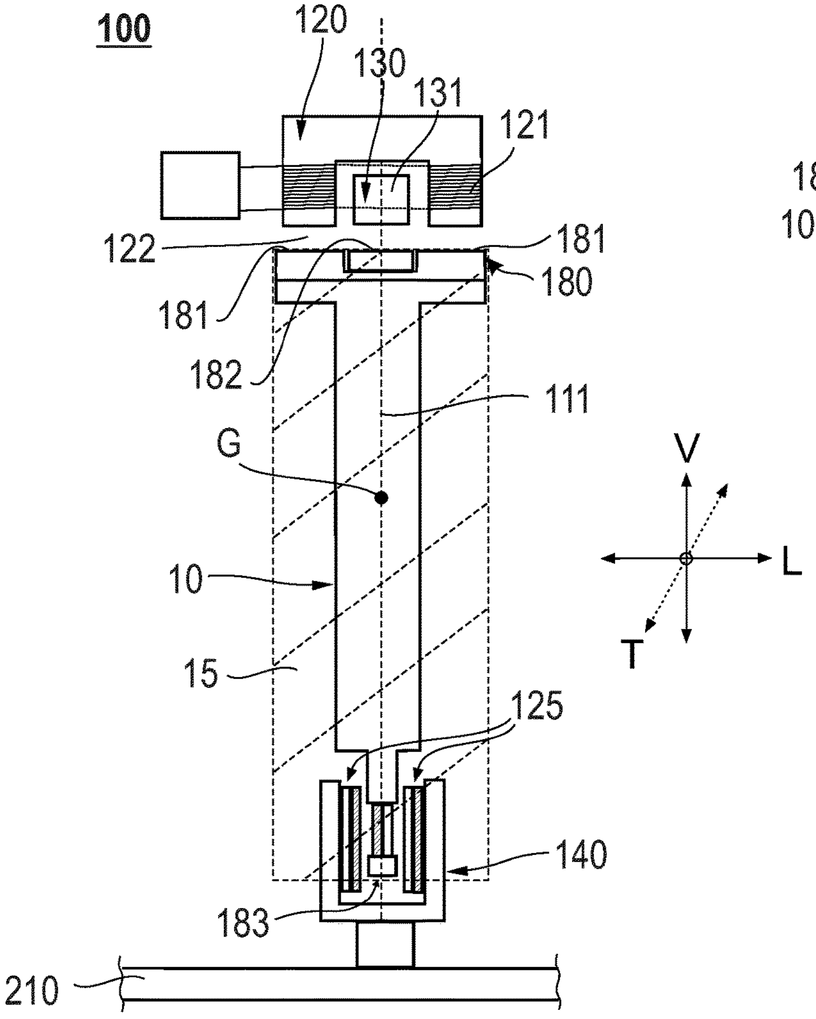
FIG. 1 shows a schematic sectional view of a magnetic levitation system according to embodiments described herein.

With exemplary reference to FIG. 1, a magnetic levitation system 100 for transporting a carrier 10 in a transport direction T according to the present disclosure is described. The transport direction T is perpendicular to the paper plane of FIG. 1.

According to embodiments, which can be combined with any other embodiments described herein, the magnetic levitation system 100 includes at least one magnetic bearing 120 having a first actuator 121 for contactlessly holding the carrier 10 in a carrier transportation space 15. The carrier transportation space 15 may be understood as a zone where the carrier is arranged during the transport of the carrier in the transportation direction T along a transport path. In particular, as exemplarily shown in FIG. 1, the carrier transportation space can be a vertical carrier transportation space having a height H extending in a vertical direction and a width W extending in a horizontal direction. For instance, the aspect ratio of H/W can be $H/W \geq 5$, particularly $H/W \geq 10$. Further, the magnetic levitation system 100 includes a drive unit 130 having a second actuator 131 for moving the carrier 10 in the transport direction The first actuator 121 and the second actuator 131 may both be arranged above the carrier transportation space 15 or may both be arranged below the carrier transportation space 15. In the embodiments described in the following, both the first actuator 121 of the at least one magnetic bearing 120 and the second actuator 131 of the at least one drive unit 130 are arranged above the carrier transportation space 15.

Accordingly, embodiments of the magnetic levitation system 100 as described herein are improved compared to conventional carrier transportation apparatuses, particularly with respect to accurate and smooth transportation of the carriers in high temperature vacuum environments. Further, embodiments as described herein beneficially provide for more robust contactless carrier transportation at lower production costs compared to conventional carrier transportation apparatuses. In particular, embodiments of the magnetic levitation system as described herein are more insensitive to manufacturing tolerances, deformation, and thermal expansion. Further, beneficially a simpler integration of the magnetic levitation system into the chamber is provided.

Before various further embodiments of the present disclosure are described in more detail, some aspects with respect to some terms used herein are explained.

In the present disclosure, a "magnetic levitation system" can be understood as a system configured for holding an object, e.g. a carrier, in a floating manner by using magnetic forces. In the present disclosure, the term "levitating" or "levitation" refers to a state of an object, e.g. a carrier carrying a substrate or a mask, wherein the weight of the object is carried without mechanical support by magnetic forces of magnetic actuators. In some embodiments, the carrier may float without mechanical contact or support. On the other hand, "moving" or "transporting" an object refers to providing a driving force in a transport direction, e.g. a force in a direction different from the levitation force, wherein the object is moved from one position to another, different position, for example a different position along the transport direction. For example, a carrier carrying a substrate or a mask can be levitated, i.e. by a force counteracting gravity, and can be moved in a direction different from a direction parallel to gravity while being levitated.

In particular, the first actuator 121 of the magnetic bearing may exert a vertical force on the carrier for counteracting the gravity force of the carrier, and the second actuator 131 of the drive unit may exert a horizontal force on the carrier for moving the carrier to a different position in the transport direction T along a transport path.

In the present disclosure, the term "contactless" can be understood in the sense that a weight, e.g. the weight of a carrier, particularly the weight of a carrier carrying a substrate or a mask, is not held by a mechanical contact or mechanical forces, but is partially or completely held by a magnetic force. In other words, the term "contactless" as used throughout the description can be understood in that a carrier is held in a levitating or floating state using magnetic forces instead of mechanical forces, i.e. contact forces.

As schematically shown in FIG. 1, the carrier 10 is contactlessly held in the carrier transportation space 15, particularly between an upper chamber wall and a bottom chamber wall of a vacuum chamber 210. In particular, the upper chamber wall can be a ceiling of a vacuum chamber, and the bottom chamber wall can be the bottom wall of a vacuum chamber 210.

In the present disclosure, a "carrier" can be understood as a carrier configured for holding a substrate, also referred to as a substrate carrier. For instance, the carrier can be a substrate carrier for carrying a large area substrate. It is to be understood that the embodiments of the magnetic levitation system may also be used for other carrier types, e.g. mask carriers. Accordingly, additionally or alternatively, the carrier may be a carrier configured for carrying a mask.

In the present disclosure, the term "substrate" may particularly embrace substantially inflexible substrates, e.g., a wafer, slices of transparent crystal such as sapphire or the like, or a glass plate. However, the present disclosure is not limited thereto, and the term "substrate" may also embrace flexible substrates such as a web or a foil. The term "substantially inflexible" is understood to distinguish over "flexible". Specifically, a substantially inflexible substrate can have a certain degree of flexibility, e.g. a glass plate having a thickness of 0.5 mm or below, wherein the flexibility of the substantially inflexible substrate is small in comparison to the flexible substrates. According to embodiments described herein, the substrate may be made of any material suitable for material deposition. For instance, the substrate may be made of a material selected from the group consisting of glass (for instance soda-lime glass, borosilicate glass etc.), metal, polymer, ceramic, compound materials, carbon fiber materials or any other material or combination of materials which can be coated by a deposition process.

In the present disclosure, the term "large area substrate" refers to a substrate having a main surface with an area of 0.5 $m^2$ or larger, particularly of 1 $m^2$ or larger. In some embodiments, a large area substrate can be GEN 4.5, which corresponds to about 0.67 $m^2$ of substrate (0.73 m×0.92 m), GEN 5, which corresponds to about 1.4 $m^2$ of substrate (1.1 m×1.3 m), GEN 7.5, which corresponds to about 4.29 $m^2$ of substrate (1.95 m×2.2 m), GEN 8.5, which corresponds to about 5.7 $m^2$ of substrate (2.2 m×2.5 m), or even GEN 10, which corresponds to about 8.7 $m^2$ of substrate (2.85 m×3.05 m). Even larger generations such as GEN 11 and GEN 12 and corresponding substrate areas can similarly be implemented. Further, the substrate thickness can be from 0.1 to 1.8 mm, particularly about 0.9 mm or below, such as 0.7 mm or 0.5.

In the present disclosure, the term "transport direction T" can be understood as the direction in which the carrier is transported along a transport path by the drive unit. Typically, the transport direction can be an essentially horizontal direction.

In the present disclosure, a "magnetic bearing" can be understood as a bearing configured for holding or supporting an object, e.g. a carrier as described herein, in a contactless manner (without or essentially without physical contact). Accordingly, the at least one magnetic bearing as described herein may be configured to generate a magnetic force acting on the carrier, such that the carrier is contactlessly held at a predetermined distance from a base structure, e.g. the upper chamber wall. In particular, the at least one magnetic bearing 120 can be configured to generate a magnetic force acting in an essentially vertical direction V such that the vertical width of a gap 122 between the first actuator 121 and the carrier 10 can be maintained essentially constant.

Some embodiments described herein involve the notion of a "vertical direction V". A vertical direction is considered a direction substantially parallel to the direction along which the force of gravity extends. A vertical direction may deviate from exact verticality (the latter being defined by the gravitational force) by an angle of up to 15 degrees. Further, some embodiments described herein may involve the notion of a "lateral direction L". A lateral direction is to be understood to distinguish over a vertical direction. The lateral direction L may be perpendicular or substantially perpendicular to the exact vertical direction defined by gravity and may be perpendicular to the transport direction T.

In the present disclosure, a "first actuator" of the at least one magnetic bearing can be understood as an active and controllable element of the magnetic bearing. In particular, the first actuator may include a controllable magnet such as an electromagnet. The magnetic field of the first actuator may be actively controllable for maintaining and/or adjusting the distance between the first actuator and the carrier 10. In other words, the "first actuator" of the at least one magnetic bearing can be understood as an element with a controllable and adjustable magnetic field to provide a magnetic levitation force acting on the carrier.

Accordingly, the first actuator 121 is configured for contactlessly holding the carrier. As exemplarily shown in FIG. 1, a magnetic counterpart 180 may be arranged at the carrier 10, particularly at a top part of the carrier. The magnetic counterpart 180 of the carrier may magnetically interact with the first actuator 121 of the at least one magnetic bearing 120. In particular, the magnetic counterpart 180 can include one or more passive magnetic elements. In particular, the magnetic counterpart 180 may be made of a magnetic material, such as a ferromagnetic material, e.g. magnetic steel or iron.

In some implementations, an output parameter such as an electric current which is applied to the first actuator 121 may be controlled depending on an input parameter such as a distance between first actuator 121 and the carrier 10. For instance, a distance (e.g. the width of the gap 122 indicated in FIG. 1) may be measured by a distance sensor, and the magnetic field strength of the first actuator 121 may be set depending on the measured distance. In particular, the magnetic field strength may be increased in the case of a distance above a predetermined threshold value, and the magnetic field strength may be decreased in the case of a distance below the threshold value. The first actuator may be controlled in a closed loop or feedback control.

In the present disclosure, a "drive unit" can be understood as a unit configured for moving an object, e.g. a carrier as described herein, in a contactless manner in the transport direction. In particular, the drive unit as described herein may be configured to generate a magnetic force acting on the carrier in the transport direction. Accordingly, the drive unit can be a linear motor, particularly a synchronous linear motor. For example, the linear motor can be an iron-core linear motor. Alternatively, the linear motor can be an ironless linear motor. An ironless linear motor can be beneficial for avoiding a torsional moment on the carrier caused by vertical forces due to possible interaction of the passive magnetic elements of the carrier and the iron-core of the linear motor.

More specifically, as exemplarily shown in FIG. 1, the drive unit includes a second actuator 131 configured for contactlessly moving the carrier in the transport direction T. The second actuator can be a stator of a linear motor, particularly of a synchronous linear motor. The second actuator 131 may include one or more magnets, e.g. electromagnets. Accordingly, the second actuator may be controllable for exerting a moving force on the carrier in the transport direction. As exemplarily shown in FIG. 1, a drive counterpart 182 may be arranged at the carrier 10, particularly at a top part of the carrier. The drive counterpart 182 of the carrier may magnetically interact with the second actuator 131 of the drive unit 130. In particular, the drive counterpart 182 can include passive magnetic elements. For instance, the drive counterpart 182 may be made of a magnetic material, such as a ferromagnetic material, a permanent magnet or may have permanent magnetic properties. The drive counterpart 182 may correspond to the (unrolled) rotor of a linear motor.

The drive counterpart 182 may include a plurality of permanent magnets arranged in a linear arrangement at a top part or a bottom part of the carrier. In particular, the plurality of permanent magnets may be arranged with polarities alternating in the transport direction T at a top surface of the carrier.

According to some embodiments, which can be combined with other embodiments described herein, the first actuator 121 and the second actuator 131 may be arranged in an atmospheric space 110 (see FIG. 4), and the carrier transportation space 15 may be in an inner volume of a vacuum chamber. The expression "atmospheric space" can be understood as a space having atmospheric pressure conditions, i.e. approximately 1.0 bar. For example, the atmospheric space may be a space provided outside the vacuum chamber. Alternatively, the atmospheric space can be provided by an atmospheric box or atmospheric container provided inside the vacuum chamber.

Figure 4:
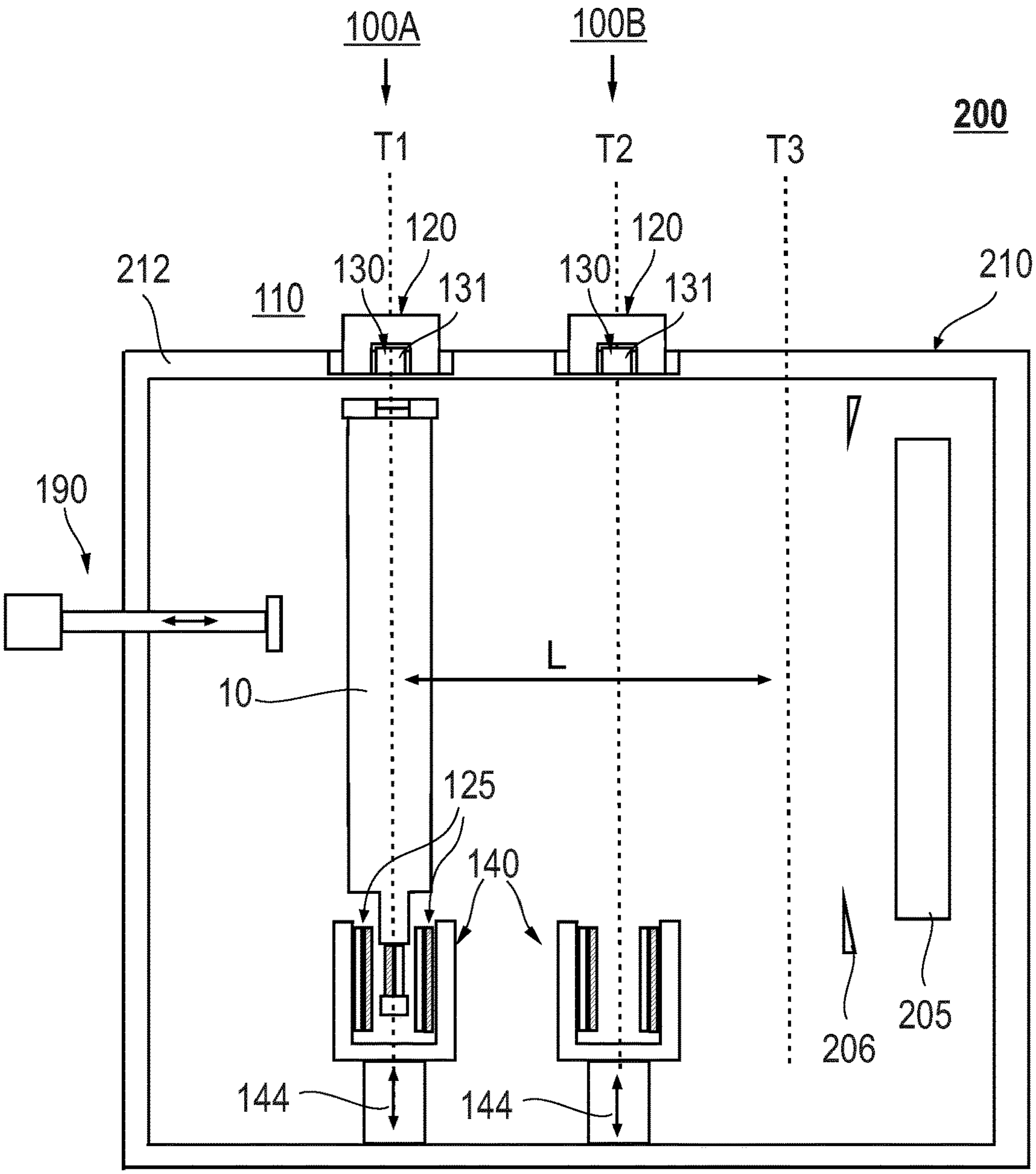
FIG. 4 shows a schematic sectional view of a processing system for vertically processing a substrate according to embodiments described herein.

According to some embodiments, which can be combined with other embodiments described herein, the first actuator 121 and the second actuator 131 can be attached to an outside surface of an upper chamber wall 212, particularly of a vacuum chamber 210 (see FIG. 4 in this respect). Accordingly, beneficially the active elements of the at least one magnetic bearing are arranged at a location which is well accessible for mounting and/or maintenance resulting in a reduction of costs. According to an example, the outside surface of the upper chamber wall 212 may include receptions for receiving the first actuator 121 and the second actuator 131 (see FIG. 4 in this respect).

Referring again to FIG. 1, according to some embodiments which can be combined with other embodiments described herein, the magnetic levitation system 100 may further include a contactless guiding arrangement 140 for guiding the carrier 10 in the transport direction T. The contactless guiding arrangement 140 may be arranged in a lower portion of the carrier transportation space 15. For instance, the contactless guiding arrangement 140 can include one or more passive magnetic bearings 125. In particular, as exemplarily shown in FIG. 1, the one or more passive magnetic bearings 125 can be vertically arranged. Accordingly, the one or more passive magnetic bearings 125 may be configured for providing a magnetic force acting on the carrier in a horizontal direction, particularly the lateral direction L, as exemplarily indicated in FIG. 1.

For instance, as exemplarily shown in FIG. 1, the one or more passive magnetic bearings 125 may be provided by vertically parallel arranged passive magnetic elements. Typically, at least two passive magnetic elements are arranged to provide a reception for a further magnetic counterpart 183 of the carrier. Accordingly, in the presence of the carrier, the further magnetic counterpart 183 is arranged between oppositely arranged passive magnetic elements of the one or more passive magnetic bearings 125. Typically, the further magnetic counterpart 183 includes a passive magnetic element. In FIG. 1, a north pole N portion of the passive magnetic elements is schematically indicted by the hatching pattern. A south pole portion of the passive magnetic elements is represented by the blank element adjacent to the north pole N portion.

As exemplarily shown in FIG. 1, the passive magnetic elements of the one or more passive magnetic bearings 125 and the further magnetic counterpart 183 may be arranged such that a south pole portion of the passive magnetic element of the further magnetic counterpart 183 faces a south pole portion of the passive magnetic element of the one or more passive magnetic bearings 125 (right hand side of the contactless guiding arrangement 140 shown in FIG. 1). Accordingly, a north pole portion of the passive magnetic element of the further magnetic counterpart 183 may face a north pole portion of the passive magnetic element of the one or more passive magnetic bearings 125 (left hand side of the contactless guiding arrangement 140 shown in FIG. 1). Accordingly, the passive magnetic elements of the one or more passive magnetic bearings 125 and the further magnetic counterpart 183 can be arranged such that repulsive magnetic forces act between the passive magnetic element of the further magnetic counterpart 183 and the passive magnetic elements of the one or more passive magnetic bearings 125. Although not explicitly shown, it is to be understood that alternatively the passive magnetic elements of the one or more passive magnetic bearings 125 and the further magnetic counterpart 183 can be arranged such that attractive magnetic forces act between the passive magnetic element of the further magnetic counterpart 183 and the passive magnetic elements of the one or more passive magnetic bearings 125.

Accordingly, beneficially a contactless lateral guiding of the carrier can be provided. Further, it is to be noted that providing a passive guiding arrangement is particularly well suited for providing a robust carrier transport in high temperature vacuum environments at low costs.

In the present disclosure, a "passive magnetic bearing" can be understood as a bearing having passive magnetic elements, which are not subject to active control or adjustment, at least not during operation of the apparatus. In particular, a passive magnetic bearing may be adapted for generating a magnetic field, e.g. a static magnetic field. In other words, a passive magnetic bearing may not be configured for generating an adjustable magnetic field. For instance, the magnetic elements of the one or more passive magnetic bearings may be made of a magnetic material, such as a ferromagnetic material, a permanent magnet or may have permanent magnetic properties.

Accordingly, a "passive magnetic element" or "passive magnet" as used herein may be understood as a magnet which is not actively controlled, e.g. via a feedback control. For example, no output parameter such as a magnetic field strength of the passive magnet is controlled depending on an input parameter such as a distance. The "passive magnetic element" or "passive magnet" may rather provide a side stabilization of the carrier without any feedback control. For example, a "passive magnetic element" or "passive magnet" as described herein may include one or more permanent magnets. Alternatively or additionally, a "passive magnetic element" or "passive magnet" may include one or more electromagnets which may not be actively controlled.

According to some embodiments described herein, the first actuator 121 includes a U-shaped electromagnet for holding the carrier 10 in the carrier transportation space 15, and the second actuator 131 is at least partially surrounded by the U-shaped electromagnet. Embodiments in which the second actuator 131 is partially surrounded by the U-shaped electromagnet of the first actuator 121 are depicted in FIG. 1 and FIG. 4.

Figure 2:
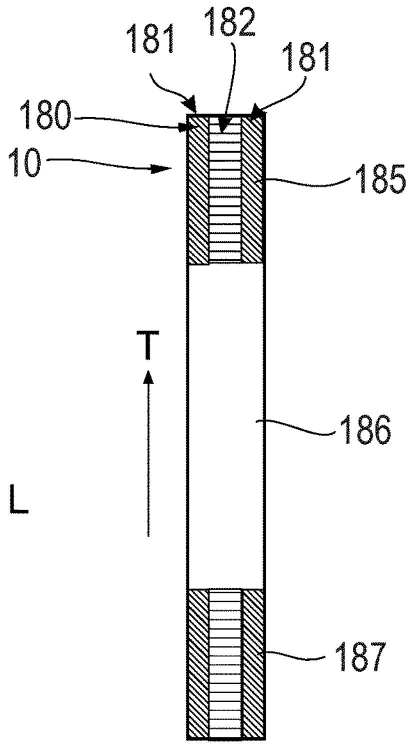
FIG. 2 shows a schematic top view of a carrier for a magnetic levitation system according to embodiments described herein.
Figure 3A:
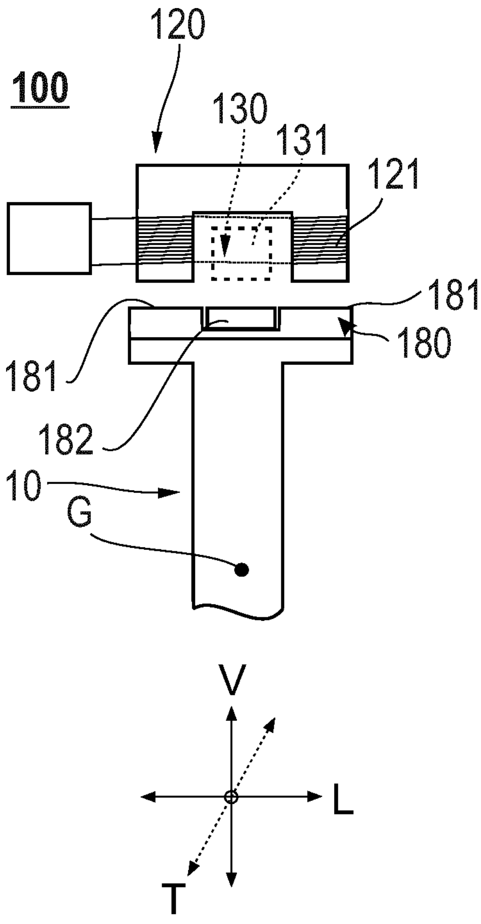
FIG. 3A shows a schematic sectional view of a magnetic levitation system according to further embodiments described herein.
Figure 3B:
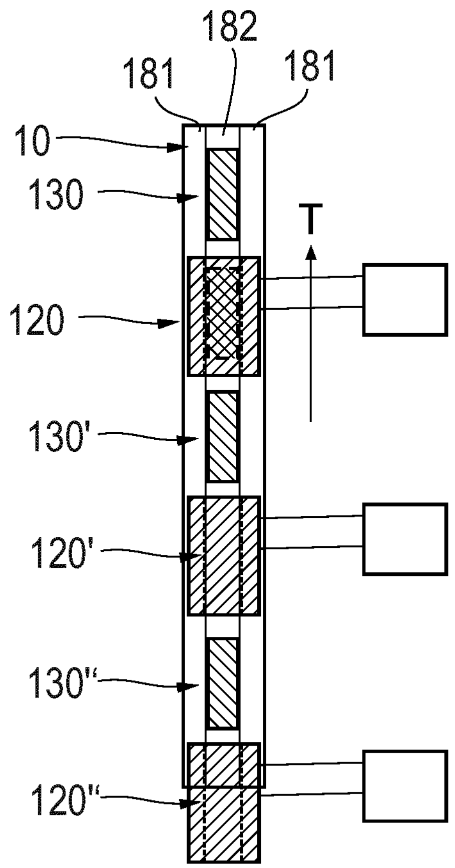
FIG. 3B shows a schematic top view of the magnetic levitation system of FIG. 3A.

According to other embodiments described herein, the first actuator 121 includes a U-shaped electromagnet for holding the carrier 10 in the carrier transportation space 15, and a projection of the second actuator 131 along the transport direction T is partially surrounded by the U-shaped electromagnet. Such an embodiment is depicted in FIGS. 3A and 3B. The projection of the second actuator 131 is illustrated in dashed lines in FIG. 3A. The second actuator 131 is actually arranged offset relative to the first actuator 121 in the transport direction T, as is better visible in the top view of FIG. 2B.

In some embodiments, the U-shaped electromagnet of the first actuator 121 surrounds the second actuator 131 on three sides thereof, particularly on two opposite sides in the lateral direction and on the top side of the second actuator. In other embodiments (not shown in the figures) having the first and second actuators arranged below the carrier transportation space, the U-shaped electromagnet of the first actuator may surround the second actuator on two opposite sides in the lateral direction and on the bottom side of the second actuator.

Since the second actuator is partially surrounded by the first actuator, a compact magnetic levitation system can be provided, having the drive unit arranged at least partially "within" the levitation magnet. In particular, the magnetic bearing and the drive unit may be integrated or at least partially integrated, such that a compact magnetic levitation- and drive-arrangement is provided.

In some embodiments, the U-shaped electromagnet of the first actuator 121 has a U-shaped core with two legs that are surrounded by a winding. The winding that surrounds both legs of the electromagnet may be powered by a power source and/or a controller in some implementations. The ends of the two legs of the U-shaped core may provide the two poles of the electromagnet of the first actuator, such that magnetic levitation forces with corresponding absolute values can be exerted on the carrier by the two legs. In particular, the two legs of the U-shaped core may be directed toward the carrier transportation space 15 for exerting magnetic forces on the carrier 10, as is schematically depicted in FIG. 1.

In particular, the two legs of the U-shaped electromagnet may be directed in a downward direction toward the carrier transportation space 15, a first leg being arranged on a right side of the vertical plane 111 and a second leg being arranged on a left side of the vertical plane 111. The vertical plane 111 that extends vertically through a center of the carrier transportation space 15 and is parallel to the transport direction T is also referred to herein as a center plane.

The two legs may be arranged symmetrically with respect to the vertical plane 111 extending through the center of gravity G of the carrier, when the carrier is held by the first actuator 121. Since the two legs constitute the two poles of one electromagnetic actuator, corresponding levitation forces can be exerted on the carrier symmetrically with respect to the center of gravity G of the carrier, providing a smooth and stable carrier levitation.

In some embodiments, the two legs of the U-shaped electromagnet may be directed toward the carrier transportation space 15 for magnetically interacting with the magnetic counterpart 180 of the carrier, particularly with two surfaces 181 of the magnetic counterpart 181 of the carrier, e.g. two top surfaces of the magnetic counterpart 181 directed in an upward direction. The two surfaces 181 of the magnetic counterpart 180 may extend parallel to each other along a top end (or alternatively along a bottom end) of the carrier.

In embodiments, which can be combined with other embodiments described herein, the first actuator 121 is centered above the carrier transportation space 15. In particular, when the carrier 10 is held by the first actuator 121, the first actuator is centered above (or alternatively centered below) the center of gravity G of the carrier 10, as is schematically depicted in FIG. 1. Since the first actuator 121 is centered above the center of gravity G of the carrier, the magnetic levitation forces exerted by the first actuator 121 act symmetrically with respect to the vertical plane 111 on the carrier, allowing a stable and smooth carrier levitation.

In particular, a base of the U-shaped electromagnet that connects the two legs of the U-shaped electromagnet may be centered above the carrier transportation space, such that the two legs of the U-shaped electromagnet are arranged symmetrically on both sides of the vertical plane 111 that extends along the transport direction T through the center of gravity G of the carrier during the carrier transport. The vertical plane 111 is also referred to herein as the center plane of the carrier transportation space 15.

In some embodiments, which can be combined with other embodiments described herein, the second actuator 131 is centered above the carrier transportation space 15. In particular, the second actuator 131 is arranged centrally above (or centrally below) the center of gravity of the carrier during the carrier transport. More particularly, the second actuator 131 may be intersected by the center plane (the vertical plane 111) of the carrier transportation space. Accordingly, the driving force exerted by the drive unit 130 acts symmetrically with respect to the center of gravity on the carrier, providing a stable and smooth carrier movement.

In some embodiments, which can be combined with other embodiments described herein, both the first actuator 121 and the second actuator 131 are centered above (or alternatively centered below) the carrier transportation space 15. In particular, during the carrier transport, the first actuator 121 and the second actuator 131 are centrally arranged above the center of gravity G of the carrier 10. Accordingly, both the levitation force of the at least one magnetic bearing 120 and the driving force of the drive unit 130 act symmetrically with respect to the center plane on the carrier, providing a stable and smooth carrier transport and levitation.

According to one aspect herein, a magnetic levitation system for transporting a carrier 10 in the transport direction T is described, including at least one magnetic bearing 120 with a first actuator 121 and a drive unit 130 with a second actuator 131, wherein both the first actuator 121 and the second actuator 131 are centered above (or alternatively centered below) the carrier transportation space 15. In particular, both the first actuator 121 and the second actuator 131 are arranged symmetrically relative to the center plane of the carrier transportation space 15. Accordingly, both the levitation forces and the drive forces can be exerted symmetrically relative to the center plane on the carrier.

The first actuator 121 may include a U-shaped electromagnet, and/or the second actuator 131 or a projection thereof may be partially surrounded by the U-shaped electromagnet. Accordingly, an integrated transportation arrangement including both the first and the second actuator within the same accommodation space can be provided, both actuators being centered relative to the carrier transportation space.

In some implementations, the second actuator 131 may include or be a stator of a linear electromotor, particularly of a synchronous linear motor.

The at least one magnetic bearing 120 may be an actively controllable magnetic bearing, particularly including a U-shaped electromagnet configured to be actively controlled for maintaining a specified distance between the first actuator 121 and the carrier.

As is schematically depicted in FIG. 1, the carrier transportation space 15 may be a vertical carrier transportation space having a height H extending in a vertical direction and a width W extending in a horizontal direction, wherein the aspect ratio of H/W is $H/W \geq 5$. The center plane of the carrier transportation space 15 may be a vertical plane 111 extending along the transport direction T and intersecting the center of gravity G of the carrier during the carrier transport.

From FIG. 1, it is to be understood that the dimension of the carrier 10 typically corresponds to the dimension of the carrier transportation space 15. Accordingly, the carrier may have a height $H_C$ corresponding to the height H of the carrier transportation space 15. Further, the carrier may have a width $W_C$ corresponding to the width W of the carrier transportation space 15. Accordingly, the aspect ratio of $H_C/W_C$ can be $H_C/W_C \geq 5$, particularly $H_C/W_C \geq 10$.

The magnetic levitation system 100 as described herein may further include the carrier 10. The carrier 10 is depicted in FIG. 1 in a sectional view and in FIG. 2 in a top view.

In some embodiments, which can be combined with other embodiments described herein, the magnetic levitation system further includes at least one side stabilization device (not depicted in the figures) with at least one stabilization magnet configured to apply a restoring force F on the carrier 10 in the lateral direction L transverse to the transport direction T. For example, at least one stabilization magnet can be arranged above the carrier transportation space 15, e.g. in an atmospheric space. Typically, the at least one stabilization magnet can be arranged at a lateral distance from the first actuator.

Accordingly, beneficially the side stabilization device may stabilize the carrier at a predetermined lateral position by applying a restoring force on the carrier 10 in the case of a lateral displacement of the carrier. The restoring force pushes or pulls the carrier 10 back to the predetermined lateral position in which the first actuator 121 is centered above and faces the magnetic counterpart 181 of the carrier. Accordingly, beneficially the side stabilization device may generate a stabilization force configured to counteract a displacement of the carrier from the carrier transportation space 15 in the lateral direction L. In other words, the side stabilization device may be configured to generate a restoring force F which pushes and/or pulls the carrier back into the carrier transportation space 15, when the carrier is displaced in the lateral direction L from a predetermined lateral position or equilibrium position.

The at least one stabilization magnet may be a passive magnet having a north pole N and a south pole S. In some embodiments, the at least one stabilization magnet may include a plurality of passive magnets which can be arranged one after the other in the transport direction. At least one carrier stabilization magnet (not depicted in the figures) may be attached to the carrier 10 in such a way that a displacement of the carrier 10 from the carrier transportation space 15 in the lateral direction L leads to repulsive magnetic force between the at least one stabilization magnet of the side stabilization device and the at least one carrier stabilization magnet counteracting the displacement. Accordingly, beneficially the carrier remains in the equilibrium position during the holding and during the transport of the carrier along the transport path.

The at least one carrier stabilization magnet can be a passive magnet having a north pole N and a south pole S. In particular, the least one carrier stabilization magnet can be arranged in an inverse orientation as compared to the at least one stabilization magnet of the side stabilization device, such that the north pole N of the at least one carrier stabilization magnet is arranged close to and attracted by the south pole S of the at least one stabilization magnet, and the south pole S of the at least one carrier stabilization magnet is arranged close to and attracted by the north pole N of the at least one stabilization magnet of the side stabilization device, when the carrier is arranged in the equilibrium position. When the carrier is displaced from the equilibrium position in a first lateral direction, the north pole N of the at least one carrier stabilization magnet approaches the north pole N of the at least one stabilization magnet of the side stabilization device which leads to a restoring force, urging the carrier back toward the equilibrium position. When the carrier is displaced from the equilibrium position in a second (opposite) lateral direction, the south pole S of the at least one carrier stabilization magnet approaches the south pole S of the at least one stabilization magnet of the side stabilization device which leads to a restoring force, urging the carrier back toward the equilibrium position. Accordingly, the side stabilization device stabilizes the carrier at a predetermined lateral position such that lateral movements of the carrier can be reduced or prevented.

In some embodiments, the carrier 10 includes a magnetic counterpart 180 with two surfaces 181 extending parallel to each other in the transport direction T along a top end of the carrier for magnetically interacting with the first actuator 121, particularly with the two legs (i.e. the two poles) of the U-shaped electromagnet of the first actuator 121 that are directed toward the carrier transportation space 15. The two surfaces 181 of the magnetic counterpart 180 may be configured as two tracks or rails made of a magnetic material, such as iron or steel, i.e. a ferromagnetic material. The magnetic counterpart 180 including the two surfaces 181 may be a one-piece magnetic element or may include several magnetic elements in direct contact with each other, such that the magnetic flux lines from one leg of the first actuator 121 toward the second leg of the first actuator 121 can run along a closed path extending through the magnetic counterpart 181, i.e. from a first surface of the two surfaces 181 to the second surface of the two surfaces 181.

In some embodiments, the carrier may include a drive counterpart 182 for magnetically interacting with the second actuator 131. The drive counterpart 182 may extend between the two surfaces 181 of the magnetic counterpart 180 in the transport direction T, i.e. in the longitudinal direction of the carrier.

As can be seen in FIG. 1, the carrier may include a ferromagnetic head part having a groove provided therein for housing the drive counterpart 182. The ferromagnetic head part of the carrier may provide the two surfaces 180 of the magnetic counterpart 181 on the two sides of the groove. Accordingly, the magnetic flux lines can run along a closed path through the ferromagnetic head part of the carrier between the two surfaces 181 that may be directed upwardly toward the two legs of the first actuator 121. The drive counterpart 182 may be provided in the groove and extend in the transport direction T, i.e. in the longitudinal direction of the carrier. As can be seen in FIG. 2, in some implementations, the drive counterpart 182 includes a plurality of permanent magnets in a row configured for magnetically interacting with a stator of a linear motor. The polarities of the permanent magnets of the drive counterpart 182 may be alternating in the transport direction T, i.e. in the longitudinal direction of the carrier.

In some embodiments, which can be combined with other embodiments described herein, the magnetic counterpart 180 includes a first guided zone 185 and a second guided zone 187, wherein a recessed zone 186 is arranged between the first guided zone 185 and the second guided zone 187 in the transport direction T, the recessed zone 186 being recessed with respect to the first guided zone and the second guided zone in the vertical direction. Accordingly, the recessed zone 186 is not configured for magnetically interacting with the first actuator 121 during the carrier transport. Such a “3-zone” carrier is schematically depicted in FIG. 2 in a top view.

The first guided zone 185 may be provided at a front part of the top surface of the carrier 10, the recessed zone 186 may be provided at a center part of the top surface of the carrier 10, and the second guided zone 187 may be provided at a rear part of the top surface of the carrier. When the magnetic counterparts 181 are only provided at the front part and at the rear part of the carrier in the transport direction, with the recessed zone 186 therebetween, the risk of the top part of the carrier touching the first actuator during the transport, e.g. due to a bending of the top wall of the vacuum chamber, can be reduced.

Optionally, as is schematically depicted in FIG. 2, the drive counterpart 182 may include a first magnet section and a second magnet section, the first magnet section and the second magnet section being spaced-apart from each other in the transport direction, as is schematically depicted in FIG. 2. For example, the magnets of first magnet section may be arranged in a groove provided between the two surfaces 181 of the first guided zone 185, and the magnets of the second magnet section may be arranged in a groove provided between the two surfaces 181 of the second guided zone 187. Optionally, no permanent magnets may be provided in the recessed zone 186 of the carrier.

FIG. 3A is a schematic sectional view of an upper part of a magnetic levitation system 100 according to embodiments described herein. The magnetic levitation system of FIG. 3A essentially corresponds to the magnetic levitation system of FIG. 1, such that reference can be made to the above explanations, which are not repeated here.

The magnetic levitation system 100 is configured for transporting a carrier 10 in the transport direction T, i.e. perpendicular to the paper plane. The magnetic levitation system 100 includes at least one magnetic bearing 120 with a first actuator 121 for generating a magnetic levitation force acting on the carrier 10. Accordingly, the carrier can be held in the carrier transportation space 15 below the first actuator 121. The magnetic levitation system 100 further includes a drive unit 130, particularly a linear motor, having a second actuator 131 for moving the carrier in the transport direction T.

A projection of the second actuator 131 along the transport direction may be partially surrounded by a U-shaped electromagnet of the first actuator 121. In other words, if the second actuator 131 were shifted along the transport direction, the second actuator 131 would be partially surrounded by the U-shaped electromagnet. For this reason, the second actuator 131 is illustrated in dashed lines in FIG. 3A.

In particular, in some embodiments, the first actuator 121 and the second actuator 131 are arranged adjacent to each other in the transport direction, but do not overlap. This configuration may also be referred to herein as a “partial integration” of the linear motor and the levitation actuator. On the other hand, the embodiment of FIG. 1 in which the second actuator 131 is partially surrounded by the first actuator 121, i.e. the first and second actuator overlap with each other, may also be referred to herein as a “full integration”, of the linear motor and the levitation actuator.

In some embodiments, the first actuator and the second actuator may be controlled by a common controller.

In some embodiments, the magnetic levitation system 100 may include a plurality of magnetic bearings 120, 120', 120" and a plurality of drive units 130, 130', 130", wherein first actuators of the plurality of magnetic bearings and second actuators of the plurality of drive units are alternately arranged in the transport direction (as is depicted in the top view of FIG. 3B), e.g. with an offset therebetween.

Alternatively, the first actuators of the plurality of magnetic bearings and the second actuators of the drive units overlap with each other, or are fully integrated with each other (see FIG. 1), each second actuator being surrounded by a first actuator on three sides thereof. In particular, a plurality of first actuators with U-shaped electromagnets may be arranged next to each other in the transport direction, wherein the U-shaped electromagnets surround respective second actuators of the plurality of drive units on three sides thereof, respectively.

The first actuators 121 of the plurality of magnetic bearings and the second actuators 131 of the plurality of drive units may respectively be centered above (or alternatively centered below) the carrier transportation space, particularly centered relative to the center plane of the carrier transportation space. During the carrier transport, the center of gravity G of the carrier may be arranged below both the first and the second actuators.

With exemplary reference to FIG. 4, a processing system 200 for vertically processing a substrate according to the present disclosure is described. According to embodiments which can be combined with any other embodiments described herein, the processing system 200 includes at least one vacuum chamber 210 including a processing device

205. In particular, typically the processing device 205 is arranged in the vacuum chamber 210 and the processing device 205 may be selected from the group consisting of a deposition source, an evaporation source, and a sputter source. The term "vacuum" can be understood in the sense of a technical vacuum having a vacuum pressure of less than, for example, 10 mbar. Typically, the pressure in a vacuum chamber as described herein may be between $10^{-5}$ mbar and about $10^{-8}$ mbar, more typically between $10^{-5}$ mbar and $10^{-7}$ mbar, and even more typically between about $10^{-6}$ mbar and about $10^{-7}$ mbar. According to some embodiments, the pressure in the vacuum chamber may be considered to be either the partial pressure of the evaporated material within the vacuum chamber or the total pressure (which may approximately be the same when only the evaporated material is present as a component to be deposited in the vacuum chamber). In some embodiments, the total pressure in the vacuum chamber may range from about $10^{-4}$ mbar to about $10^{-7}$ mbar, especially in the case that a second component besides the evaporated material is present in the vacuum chamber (such as a gas or the like). Accordingly, the vacuum chamber can be a "vacuum deposition chamber", i.e. a vacuum chamber configured for vacuum deposition.

Further, as exemplarily shown in FIG. 4, the processing system 200 includes one or more magnetic levitation systems for transporting one or more carriers in a transport direction T in accordance with any of the embodiments described herein.

For example, the processing system 200 may include a first magnetic levitation system 100A and a second magnetic levitation system 100B. The first magnetic levitation system 100A and the second magnetic levitation system 100B can be configured according to any embodiment described herein, in particular as described with reference to FIGS. 1 to 3B. As shown in FIG. 4, the first magnetic levitation system 100A providing a first transport path T1 may be provided next to the second magnetic levitation system 100B providing a second transport path T2. In particular, the second magnetic levitation system 100B is horizontally offset from the first magnetic levitation system 100A. Accordingly, the second transport path T2 is horizontally offset from the first transport path T1.

The one or more magnetic levitation systems of the processing system 200 respectively include at least one magnetic bearing 120 having a first actuator 121 for contactlessly holding the carrier 10 in a carrier transportation space 15. In particular, one magnetic levitation system includes a plurality of magnetic bearings that are arranged along the respective transport path with an offset between respective adjacent magnet bearings. Accordingly, a carrier can be contactlessly held along the transport path that is defined by the respective magnetic levitation system.

Additionally, the one or more magnetic levitation systems include a respective drive unit 130, particularly a plurality of drive units, having a second actuator 131 for moving the carrier 10 in the transport direction T. The first actuator 121 and the second actuator 131 may both be arranged above (or alternatively both below) the carrier transportation space 15.

According to some embodiments, which can be combined with any other embodiments described herein, the processing system 200 may further include a track switch assembly 190 configured to move the carrier from the first transport path T1 to the second transport path T2 in a path switch direction S, as exemplarily indicated in FIG. 4. Typically, the path switch direction S corresponds to the lateral direction L. Further, the track switch assembly 190 may be configured to move the carrier to a processing position T3 horizontally offset from the first and second transport paths.

Further, as exemplarily indicated by the double-sided arrows 144 in FIG. 4, the contactless guiding arrangement 140 of the first magnetic levitation system 100A and of the second magnetic levitation system 100B can optionally be movable in a vertical direction in order to allow the movement of the carrier in the path switch direction S. Further, as exemplarily shown in FIG. 4, a mask 206 (e.g. an edge exclusion mask) may be provided between the processing position T3 and the processing device 205.

In some embodiments, the distal ends of the two legs of the U-shaped electromagnet, the lower end of the second actuator 131 and/or the lower end of an optional side stabilization device are flush with each other and/or do not protrude substantially into the vacuum chamber. Further, the magnetic counterpart 180, the drive counterpart 182 and/or an optional side stabilization magnet of the carrier may be essentially flush with each other, e.g. may be provided in one horizontal plane. Accordingly, the carrier can be transferred in the lateral direction L away from the carrier transportation space, e.g. by the track switch assembly 190 that is schematically depicted in FIG. 4, without the risk of magnet units impeding each other.

Figure 5:
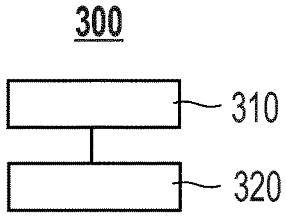
FIG. 5 shows a flowchart for illustrating a method of transporting a carrier according to embodiments described herein.

With exemplary reference to the flowchart shown in FIG. 5, a method 300 of transporting a carrier according to the present disclosure is described. According to embodiments, which can be combined with any other embodiments described herein, the method 300 includes contactlessly holding the carrier in a carrier transportation space using at least one magnetic bearing 120 having a first actuator with a U-shaped electromagnet (represented by box 310).

The method further includes transporting the carrier in the transport direction T using a drive unit 130 having a second actuator, wherein the second actuator or a projection of the second actuator along the transport direction T is partially surrounded by the U-shaped electromagnet (represented by box 320).

In some embodiments, during the carrier transport, two legs of the U-shaped electromagnet are directed toward two surfaces of a magnetic counterpart 180 extending along a top end of the carrier in the transport direction T, such that the two legs of the electromagnet magnetically interact with the two surfaces. The magnetic counterpart 180 may include two ferromagnetic tracks extending parallel to each other at a head part of the carrier.

Alternatively or additionally, the second actuator magnetically interacts with a drive counterpart 182 arranged between the two surfaces of the magnetic counterpart 180 at the head part of the carrier. The drive counterpart may include a plurality of permanent magnets in an alternating arrangement.

During the carrier transport, both the first actuator 121 and the second actuator 131 may be arranged centrally above the center of gravity G of the carrier, when the carrier moves below the first actuator and the second actuator. In particular, the center plane of the magnetic levitation system may (centrally) intersect both the first actuator and the second actuator, such that the magnetic forces exerted by both the first actuator and the second actuator act on the carrier symmetrically relative to the center plane.

The second actuator 131 may be fully or partially integrated with the first actuator 121. In particular, the second actuator may be accommodated in an accommodation space provided by the first actuator 121, particularly surrounded by a U-shaped core of an electromagnet of the first actuator, e.g. on three sides.

Optionally, the first and second actuators may be arranged in an atmospheric space, particularly outside a vacuum chamber, e.g. above a top wall of the vacuum chamber. In some embodiments, the first and second actuator may be attached to an outside surface of an upper chamber wall of the vacuum chamber.

In view of the above, it is to be understood that compared to the state of the art, embodiments of the present disclosure beneficially provide for a magnetic levitation system, a processing system, and a method of transporting a carrier which are improved with respect to accurate and smooth transportation of the carriers in high temperature vacuum environments, particularly for high quality display manufacturing. Further, embodiments as described herein beneficially provide for more robust contactless carrier transportation at lower production costs compared to conventional carrier transportation apparatuses.

In embodiments described herein, the drive force and the levitation force can be applied symmetrically on the carrier with respect to the center of gravity of the carrier. Accordingly, disturbing forces acting on the carrier as well as torques can be reduced. The drive track and the levitation actuator track may be partially or fully integrated, allowed a space-saving compact design of the magnetic levitation system. Further, a smooth and reliable carrier transport is obtained when the carrier has a "3-zone" design, including two guided zones and a recessed zone therebetween. Embodiments described herein allow a small number of levitation actuators to be provided. Further, the first and second actuators can be controlled with the same controller, allowing an integrated control.

While the foregoing is directed to embodiments, other and further embodiments may be devised without departing from the basic scope, and the scope is determined by the claims that follow.

The invention claimed is:

1. A magnetic levitation system for transporting a carrier in a transport direction through a vacuum chamber, comprising:

a plurality of magnetic bearings having a first actuator with a U-shaped electromagnet for contactlessly holding the carrier in a carrier transportation space, the first actuator arranged above the carrier transportation space, and the carrier transportation space is within an inner volume of the vacuum chamber; and a plurality of drive units having a second actuator for moving the carrier in the transport direction, wherein the second actuator or a projection of the second actuator along the transport direction is partially surrounded by the U-shaped electromagnet comprising a U-shaped core with two legs, the two legs being directed toward the carrier transportation space and an end of each of the two legs providing two poles of the U-shaped electromagnet for exerting magnetic levitation forces on the carrier; and a contactless guiding arrangement for guiding the carrier in the transport direction arranged in a lower portion of the carrier transportation space, the contactless guiding arrangement including one or more passive magnetic bearings adapted for generating a static magnetic field, and wherein both the first actuator and the second actuator are centered above the carrier transportation space and are arranged in an atmospheric space, and wherein the second actuator is arranged offset relative to the first actuator.

2. The magnetic levitation system of claim 1, wherein the U-shaped electromagnet surrounds the second actuator or the projection of the second actuator on two opposite lateral sides and on one of a top side and a bottom side.

3. The magnetic levitation system of claim 1, wherein the second actuator is a stator of a linear motor.

4. The magnetic levitation system of claim 3, wherein the linear motor is a synchronous linear motor.

5. The magnetic levitation system of claim 1, wherein the plurality of magnetic bearings are actively controllable magnetic bearings comprising the U-shaped electromagnet configured to be actively controlled for maintaining a specified distance between the first actuator and the carrier.

6. The magnetic levitation system of claim 1, wherein the carrier transportation space is a vertical carrier transportation space having a height H extending in a vertical direction and a width W extending in a lateral direction, wherein an aspect ratio of H/W is H/W≥5.

7. The magnetic levitation system of claim 1, further comprising the carrier, wherein the carrier includes a magnetic counterpart with two surfaces extending parallel to each other along a top surface of the carrier for magnetically interacting with the first actuator and a drive counterpart for magnetically interacting with the second actuator, the drive counterpart extending between the two surfaces of the magnetic counterpart in the transport direction.

8. The magnetic levitation system of claim 7, wherein the magnetic counterpart includes a first guided zone and a second guided zone, wherein a recessed zone is arranged between the first guided zone and the second guided zone in the transport direction of the carrier, the recessed zone being recessed with respect to the first guided zone and the second guided zone.

9. The magnetic levitation system of claim 7, wherein the carrier transportation space extends from the top surface of the carrier including the magnetic counterpart for magnetically interacting with the first actuator to a further magnetic counterpart provided at a bottom of the carrier, the further magnetic counterpart facing the one or more passive magnetic bearings of the contactless guiding arrangement, and wherein the carrier transportation space does not overlap with the first actuator and the second actuator.

10. The magnetic levitation system of claim 1, wherein, during carrier transport, the first actuator and the second actuator are centrally arranged above a center of gravity of the carrier.

11. The magnetic levitation system of claim 1, wherein the two legs are configured for magnetically interacting with a magnetic counterpart having two surfaces extending parallel to each other along a top or bottom surface of the carrier.

12. The magnetic levitation system of claim 1, wherein the U-shaped electromagnet is configured to be actively controlled in a closed loop or feedback control for maintaining a specified distance between the first actuator and the carrier.

13. The magnetic levitation system of claim 1, wherein the atmospheric space is outside the vacuum chamber.

14. The magnetic levitation system of claim 1, wherein the first actuator and the second actuator are arranged on or above an outside surface of an upper chamber wall of the vacuum chamber.

15. The magnetic levitation system of claim 1, wherein the first actuator and the second actuator are arranged in receptions provided in an outside surface of an upper chamber wall of the vacuum chamber, wherein the receptions are configured for at least partially receiving the first actuator and the second actuator.

16. A magnetic levitation system for transporting a carrier in a transport direction comprising:

a plurality of magnetic bearings comprising:

a first actuator with a U-shaped electromagnet for contactlessly holding the carrier in a carrier transportation space, the first actuator arranged above or below the carrier transportation space; and a plurality of drive units comprising:

a second actuator for moving the carrier in the transport direction, the second actuator or a projection of the second actuator along the transport direction is partially surrounded by the U-shaped electromagnet; and wherein first actuators of the plurality of magnetic bearings and second actuators of the plurality of drive units are alternately arranged in the transport direction.

17. The magnetic levitation system of claim 16, wherein, during carrier transport, the two legs of the U-shaped electromagnet are directed toward two surfaces of a magnetic counterpart extending along a top part of the carrier in the transport direction, and the second actuator magnetically interacts with a drive counterpart arranged between the two surfaces.

18. A processing system for vertically processing a substrate, comprising:

at least one vacuum chamber comprising a processing device; and one or more magnetic levitation systems for transporting one or more carriers in a transport direction through the at least one vacuum chamber, the one or more magnetic levitation systems comprising:

a plurality of magnetic bearings having a first actuator with a U-shaped electromagnet for contactlessly holding the carrier in a carrier transportation space, the first actuator arranged above the carrier transportation space, and the carrier transportation space is within an inner volume of the at least one vacuum chamber; and a plurality of drive units having a second actuator for moving the carrier in the transport direction, wherein the second actuator or a projection of the second actuator along the transport direction is partially surrounded by the U-shaped electromagnet comprising a U-shaped core with two legs, the two legs being directed toward the carrier transportation space and an end of each of the two legs providing two poles of the U-shaped electromagnet for exerting magnetic levitation forces on the carrier; and a contactless guiding arrangement for guiding the carrier in the transport direction arranged in a lower portion of the carrier transportation space, the contactless guiding arrangement including one or more passive magnetic bearings adapted for generating a static magnetic field, wherein both the first actuator and the second actuator are centered above the carrier transportation space and in an atmospheric space, and wherein the second actuator is arranged offset relative to the first actuator.

19. A method of transporting a carrier in a transport direction through a vacuum chamber, comprising:

contactlessly holding the carrier in a carrier transportation space using a plurality of magnetic bearings having a first actuator with a U-shaped electromagnet;

transporting the carrier in the transport direction using a plurality of drive units having a second actuator, wherein the second actuator or a projection of the second actuator along the transport direction is partially surrounded by the U-shaped electromagnet comprising a U-shaped core with two legs, the two legs being directed toward the carrier transportation space and an end of each of the two legs providing two poles of the U-shaped electromagnet for exerting magnetic levitation forces on the carrier, wherein the second actuator is arranged offset relative to the first actuator, and wherein both the first actuator and the second actuator are arranged above a center of gravity and the center of gravity of the carrier, when the carrier moves below the first actuator and the second actuator, wherein the first actuator and the second actuator are arranged in an atmospheric space, and wherein the carrier transportation space is in an inner volume of the vacuum chamber; and contactlessly guiding the carrier in the transport direction by employing a contactless guiding arrangement arranged in a lower portion of the carrier transportation space, the contactless guiding arrangement including one or more passive magnetic bearings adapted for generating a static magnetic field.

20. The method of claim 19, wherein, during carrier transport, the two legs of the U-shaped electromagnet are directed toward two surfaces of a magnetic counterpart extending along a top part of the carrier in the transport direction, and the second actuator magnetically interacts with a drive counterpart arranged between the two surfaces.

* * * * *